(12) United States Patent
Ward

(10) Patent No.: US 10,994,793 B2
(45) Date of Patent: May 4, 2021

(54) SAFETY CHAIN TIE DOWN MECHANISM FOR UNDER BED HITCH MOUNTING SYSTEM

(71) Applicant: Horizon Global Americas Inc., Plymouth, MI (US)

(72) Inventor: Brian Ward, Swartz Creek, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 658 days.

(21) Appl. No.: 15/594,906

(22) Filed: May 15, 2017

(65) Prior Publication Data

US 2017/0327161 A1    Nov. 16, 2017

Related U.S. Application Data

(60) Provisional application No. 62/336,886, filed on May 16, 2016.

(51) Int. Cl.
*B62D 53/08* (2006.01)
*B62D 53/10* (2006.01)
*B60D 1/48* (2006.01)
*B60D 1/58* (2006.01)

(52) U.S. Cl.
CPC ......... *B62D 53/0807* (2013.01); *B60D 1/488* (2013.01); *B60D 1/58* (2013.01); *B62D 53/10* (2013.01)

(58) Field of Classification Search
CPC .... B62D 53/0807; B62D 53/10; B60P 7/0807
USPC ....................... 280/491.5; 410/106, 110, 116
See application file for complete search history.

(56) References Cited

U.S. PATENT DOCUMENTS

| | | | | |
|---|---|---|---|---|
| 849,023 A | * | 4/1907 | Sargent | B60P 3/05 410/2 |
| 2,664,611 A | * | 1/1954 | Shomber | F16B 5/10 24/635 |
| 2,962,245 A | * | 11/1960 | Molzan | B64F 1/16 244/115 |
| 3,005,292 A | * | 10/1961 | Reiland | E04B 1/4107 52/99 |
| 3,106,377 A | * | 10/1963 | Cotton | B60P 7/0807 410/116 |
| 3,252,681 A | | 5/1966 | Watts | |
| 3,263,629 A | * | 8/1966 | Higuchi | B60P 7/0807 410/105 |
| 3,272,061 A | | 9/1966 | Seckerson | |

(Continued)

*Primary Examiner* — Kevin Hurley
*Assistant Examiner* — Conan D Duda
(74) *Attorney, Agent, or Firm* — McDonald Hopkins LLC

(57) ABSTRACT

A tie down apparatus that may be utilized for securing an item, such as a safety chain, wherein the tie down apparatus may be used with a hitch mounting system. In one embodiment, the tie down apparatus may include a receiving member, a tie down member, and a locking member. The receiving member may include an opening located there through. The tie down member may include at least one aperture, wherein the locking member may extend therethrough. The locking member may selectively engage the receiving member. The locking member may include a head that engages with a safety chain member positioned on the tie down apparatus to prevent disengagement between the locking member and the receiving member.

17 Claims, 7 Drawing Sheets

(56) References Cited

U.S. PATENT DOCUMENTS

| | | | | |
|---|---|---|---|---|
| 3,302,508 A * | 2/1967 | Topf | F16B 13/0808 | 411/341 |
| 3,367,000 A * | 2/1968 | Schluter | B60P 7/0807 | 24/573.11 |
| 3,421,726 A * | 1/1969 | Getter | B60P 7/0807 | 410/110 |
| 3,595,125 A * | 7/1971 | Jacobs | B60P 7/0807 | 410/106 |
| 3,739,432 A | 6/1973 | Sander et al. | | |
| 3,765,637 A * | 10/1973 | Watts | B60P 7/13 | 410/116 |
| 3,816,882 A * | 6/1974 | Maeda | B65D 55/10 | 411/549 |
| 3,823,962 A * | 7/1974 | Martin, Jr. | B60D 1/04 | 280/514 |
| 3,950,010 A * | 4/1976 | Robertson | B60P 7/0807 | 410/110 |
| 4,064,811 A * | 12/1977 | Copeland | A01K 97/10 | 410/102 |
| 4,091,744 A | 5/1978 | Crissy et al. | | |
| 4,295,765 A * | 10/1981 | Burke | B60P 7/0807 | 296/167 |
| 4,457,650 A * | 7/1984 | Tseng | B60P 7/132 | 24/265 CD |
| 4,457,653 A * | 7/1984 | Leib | F16B 13/0808 | 411/342 |
| 4,607,991 A * | 8/1986 | Porter | B60P 7/0807 | 410/110 |
| 4,630,982 A * | 12/1986 | Fenner | B61D 45/001 | 410/102 |
| 5,000,474 A * | 3/1991 | Kristensen | B60D 1/52 | 280/491.5 |
| 5,259,711 A * | 11/1993 | Beck | B60P 7/0815 | 410/101 |
| 5,265,992 A | 11/1993 | Jensen | | |
| 5,273,382 A * | 12/1993 | Yearick | F16B 13/066 | 411/64 |
| 5,330,300 A * | 7/1994 | Jones | B60P 7/0823 | 410/101 |
| 5,360,250 A * | 11/1994 | Wood | B60P 7/0807 | 296/39.2 |
| 5,409,335 A * | 4/1995 | Beck | B60P 7/0815 | 410/104 |
| 5,472,222 A * | 12/1995 | Marcy | B60D 1/06 | 280/433 |
| 5,560,666 A * | 10/1996 | Vieira | B60P 3/40 | 224/402 |
| 5,571,270 A | 11/1996 | Larkin | | |
| 5,738,363 A | 4/1998 | Larkin | | |
| 5,738,471 A * | 4/1998 | Zentner | B60P 7/0807 | 410/101 |
| 5,774,948 A * | 7/1998 | Petschke | B60P 7/0807 | 24/265 AL |
| 5,893,575 A | 4/1999 | Larkin | | |
| 5,915,900 A * | 6/1999 | Boltz | B60P 7/0807 | 410/106 |
| 5,924,611 A * | 7/1999 | Mizuno | B60R 7/005 | 224/42.4 |
| 6,065,766 A * | 5/2000 | Pulliam | F16B 21/04 | 280/415.1 |
| 6,099,015 A * | 8/2000 | Marcy | B60D 1/52 | 280/433 |
| 6,193,261 B1 | 2/2001 | Hahka | | |
| 6,196,777 B1 * | 3/2001 | Price | B60P 7/0807 | 410/101 |
| 6,382,654 B1 * | 5/2002 | Mahncke | B60D 1/488 | 280/491.1 |
| 6,422,795 B2 | 7/2002 | Holt | | |
| 6,467,791 B1 | 10/2002 | Fandrich et al. | | |
| 6,502,846 B2 | 1/2003 | Fandrich et al. | | |
| 6,520,528 B2 | 2/2003 | Fandrich et al. | | |
| 6,695,338 B1 | 2/2004 | Roberts | | |
| 6,712,568 B2 * | 3/2004 | Snyder | B60P 7/0815 | 410/102 |
| 6,764,259 B1 * | 7/2004 | Preta | B60P 7/0807 | 410/106 |
| 6,783,144 B2 * | 8/2004 | McCoy | B60D 1/06 | 280/511 |
| 6,827,531 B2 * | 12/2004 | Womack | B61D 45/001 | 410/104 |
| 6,846,140 B2 * | 1/2005 | Anderson | B60P 7/0815 | 410/102 |
| 6,869,260 B1 * | 3/2005 | Mason | B60P 7/0807 | 410/111 |
| 6,969,090 B1 | 11/2005 | Works | | |
| 6,971,662 B2 * | 12/2005 | Frischkorn | B60D 1/54 | 280/491.1 |
| 6,983,950 B2 | 1/2006 | McCoy et al. | | |
| 7,121,573 B2 * | 10/2006 | Lindenman | B62D 53/08 | 280/433 |
| 7,175,377 B2 * | 2/2007 | Womack | B60P 7/0815 | 410/104 |
| 7,401,995 B2 * | 7/2008 | Senakiewich, II | B60P 7/0815 | 403/374.4 |
| 7,472,919 B2 | 1/2009 | Pratt et al. | | |
| 7,481,610 B1 * | 1/2009 | Egigian | B60P 7/0807 | 410/106 |
| 7,614,671 B2 * | 11/2009 | Taubert | F16B 21/02 | 16/420 |
| 7,651,305 B1 * | 1/2010 | Boyd | B60P 7/0807 | 410/111 |
| 7,793,968 B1 * | 9/2010 | Withers | B60D 1/015 | 280/415.1 |
| 7,828,317 B2 * | 11/2010 | Withers | B62D 53/0828 | 280/425.2 |
| 7,874,774 B2 * | 1/2011 | Peterson | B60P 7/0815 | 410/104 |
| 7,980,798 B1 * | 7/2011 | Kuehn | B61D 45/00 | 410/104 |
| 7,988,176 B2 | 8/2011 | Colibert | | |
| 8,011,685 B2 * | 9/2011 | Belinky | B60D 1/52 | 280/491.5 |
| 8,215,658 B2 | 7/2012 | Stanifer et al. | | |
| 8,277,157 B2 * | 10/2012 | Parsons | B61D 45/001 | 410/104 |
| 8,414,009 B2 * | 4/2013 | Stanifer | B60D 1/02 | 280/433 |
| 8,529,176 B2 * | 9/2013 | Jutila | F16G 11/146 | 410/106 |
| 8,616,511 B2 * | 12/2013 | James | B63B 17/02 | 114/361 |
| 8,702,360 B1 * | 4/2014 | Smith | B64D 9/003 | 410/116 |
| 8,794,886 B1 * | 8/2014 | Nett | B60P 7/0807 | 410/106 |
| 8,814,254 B1 * | 8/2014 | Peffley | B62D 25/209 | 296/183.1 |
| 9,242,520 B2 | 1/2016 | Mida | | |
| 9,849,738 B2 * | 12/2017 | Guthard | B60D 1/015 | |
| D835,494 S * | 12/2018 | Loechel | D8/356 | |
| 10,336,146 B2 * | 7/2019 | Stanifer | B60D 1/187 | |
| 10,384,616 B2 * | 8/2019 | Sotome | F16B 45/00 | |
| 10,859,106 B1 * | 12/2020 | Wagner | F16B 21/02 | |
| 2001/0031187 A1 * | 10/2001 | Goham | B60P 7/0807 | 410/106 |
| 2003/0034633 A1 * | 2/2003 | Belinky | B60D 1/06 | 280/507 |
| 2004/0090041 A1 * | 5/2004 | Lenzen, Jr. | B60D 1/488 | 280/491.5 |
| 2004/0228699 A1 * | 11/2004 | Venton-Walters | B60P 7/0807 | 410/109 |
| 2004/0265087 A1 * | 12/2004 | Bruns | B60P 7/0807 | 410/107 |
| 2005/0036848 A1 * | 2/2005 | Cunningham | B60P 7/0815 | 410/104 |
| 2005/0079026 A1 * | 4/2005 | Speece | B60P 7/0807 | 410/106 |

(56) References Cited

U.S. PATENT DOCUMENTS

| | | | | |
|---|---|---|---|---|
| 2005/0214093 | A1* | 9/2005 | Priesgen | B60P 1/435 |
| | | | | 410/104 |
| 2006/0026806 | A1* | 2/2006 | Taylor | B60P 7/0807 |
| | | | | 24/489 |
| 2006/0163840 | A1 | 7/2006 | Schwalbe | |
| 2008/0315557 | A1 | 12/2008 | Stanifer et al. | |
| 2009/0007614 | A1* | 1/2009 | Armstrong | B60P 7/0807 |
| | | | | 70/287 |
| 2009/0184493 | A1* | 7/2009 | Eifert | B60D 1/143 |
| | | | | 280/491.5 |
| 2010/0193657 | A1* | 8/2010 | Laney | B60P 7/0807 |
| | | | | 248/499 |
| 2012/0181816 | A1* | 7/2012 | Jutila | B60P 7/0807 |
| | | | | 296/183.1 |
| 2012/0274048 | A1* | 11/2012 | Stanifer | B60D 1/28 |
| | | | | 280/491.5 |
| 2013/0094920 | A1* | 4/2013 | Massicotte | B60P 7/0815 |
| | | | | 410/82 |
| 2013/0127137 | A1* | 5/2013 | McCoy | B60D 1/06 |
| | | | | 280/511 |
| 2013/0193671 | A1* | 8/2013 | McCoy | B60D 1/28 |
| | | | | 280/495 |
| 2013/0251444 | A1* | 9/2013 | Ivanic | B60P 7/0807 |
| | | | | 403/78 |
| 2013/0307248 | A1* | 11/2013 | McCoy | B60D 1/015 |
| | | | | 280/495 |
| 2014/0064871 | A1* | 3/2014 | Blow | B60P 7/0807 |
| | | | | 410/101 |
| 2014/0160776 | A1* | 6/2014 | Sura | B60P 7/0807 |
| | | | | 362/485 |
| 2015/0028565 | A1* | 1/2015 | Bowe | B60D 1/025 |
| | | | | 280/491.5 |
| 2015/0047197 | A1* | 2/2015 | Deloubes | B64D 11/0696 |
| | | | | 29/897.2 |
| 2015/0071727 | A1* | 3/2015 | Hemphill | B60P 7/0807 |
| | | | | 410/110 |
| 2015/0086288 | A1* | 3/2015 | Williams | B60P 3/073 |
| | | | | 410/3 |
| 2015/0090847 | A1* | 4/2015 | McCoy | B60D 1/28 |
| | | | | 248/205.1 |
| 2015/0300399 | A1* | 10/2015 | Ivanic | B60P 7/0807 |
| | | | | 411/192 |
| 2015/0375686 | A1* | 12/2015 | George | B60P 1/44 |
| | | | | 248/201 |
| 2016/0167717 | A1* | 6/2016 | Marchlewski | B60P 7/0807 |
| | | | | 296/43 |
| 2016/0288693 | A1* | 10/2016 | Sterling | B60P 7/0807 |
| 2016/0355118 | A1* | 12/2016 | VanValkenburgh | B60P 7/0807 |
| 2017/0088033 | A1* | 3/2017 | Hendren | B60P 7/0807 |
| 2017/0144520 | A1* | 5/2017 | Hemphill | B60R 13/01 |
| 2017/0144866 | A1* | 5/2017 | Smetz | B60P 7/0807 |
| 2017/0174478 | A1* | 6/2017 | Smetz | B60P 7/0807 |
| 2017/0267157 | A1* | 9/2017 | Stojkovic | B60P 7/0807 |
| 2017/0305218 | A1* | 10/2017 | Stanifer | B60D 1/015 |
| 2017/0327161 | A1* | 11/2017 | Ward | B60D 1/488 |
| 2017/0355297 | A1* | 12/2017 | Chimenti | B60P 7/0807 |
| 2018/0141481 | A1* | 5/2018 | Gomes | B60P 3/064 |
| 2018/0229640 | A1* | 8/2018 | Landrum | B60P 7/0807 |
| 2019/0248269 | A1* | 8/2019 | Shivalinga | B60P 7/0807 |

* cited by examiner

SAFETY CHAIN TIE DOWN MECHANISM FOR UNDER BED HITCH MOUNTING SYSTEM

RELATED APPLICATIONS AND FIELD OF INVENTION

This application claims priority to U.S. Provisional Patent Application Ser. No. 62/336,886, filed on May 16, 2016. The entirety of that disclosure is incorporated by reference.

The present invention generally relates to a tie down apparatus used in towing and more particularly to a removable tie down apparatus for securing safety chains of a trailer being towed.

BACKGROUND

It is well known in the art to utilize a trailer hitch to connect a trailer to a towing vehicle. There are many different types of trailer hitches known in the art that are attached to the towing vehicle in a variety of ways, depending on the type of hitch. Some of the most common types of hitches include gooseneck, fifth wheel, front mount, and the like. Typically, trailers are connected to a towing vehicle by way of a ball hitch secured to the vehicle and a ball socket coupling mechanism on the trailer that mounts over the ball and thereby allows the trailer to pivot behind the towing vehicle.

The ball hitch of some hitches, such as gooseneck, for example, is commonly mounted in the bed of a pickup truck near the longitudinal centerline of the bed. This allows the weight of the trailer to be evenly distributed between the tires on the two sides of the towing vehicle, such as a pickup truck. This type of hitch is often secured to the truck structure in an opening cut in the bed of the truck so that a substantial portion of the hitch attachment is located below the bed of the truck. In addition, the ball typically may be removed or lowered to a stowed position below the bed to ensure that the use of the bed is not substantially hindered by the presence of the ball.

Gooseneck trailer hitches are typically considered heavy duty and are made to operatively tow trailers weighing 10,000 pounds or more. Gooseneck hitches are made to accommodate things like horse trailers and other oddly shaped trailers whose weight is not evenly distributed. A gooseneck hitch is designed for use in a pickup truck similar to a fifth wheel. The difference is that the gooseneck uses a ball and coupler verses a kingpin and pin receiver. Gooseneck hitches are offered in a few types of configurations and can be mounted above or below the trucks pickup bed. Either design (above or below) allows for minimal obstruction when the ball is not in the towing position.

As is known in the art, a gooseneck trailer hitch is placed in the truck bed above the rear axle and the trailer is then secured to it. A gooseneck hitch is typically much stronger than a regular ball hitch and can haul much more weight. The primary goal of the gooseneck hitch is to provide as much of the gooseneck hitch assembly as possible beneath the bed of the pick-up truck. The hitch balls themselves are typically removable or retractable so that when the hitch is not in use, the hitch ball may be removed or retracted so as not to obstruct the bed of the pick-up truck in any significant manner.

With primary emphasis placed on storing/removing these hitch assemblies to avoid obstructions within the truck bed, hitch assemblies have generally overlooked the importance of placement of maintenance fittings and typically only include such fittings in inconvenient locations, such as under the bed of the truck.

Consumers often utilize additional trailer hitch accessories with their trailers. These accessories are products that mount or secure to the trailer, such as safety chains, couplers, coupler locks, jacks, trailer lights, bearing protectors, winches and hitch balls, for example.

Safety chains are often used in conjunction with a gooseneck hitch when towing a trailer. Safety chains are an added safety measure that is used to provide a secondary means of connection between the rear of the towing vehicle and the front of the trailer or towed vehicle in case of separation. If the safety chain is to be of value, assurance must be had that the safety chain will stay connected to the link if the hitch fails. The consumer should also make sure that the safety chains are never dragging on the road when hooked up. Safety chains come in a variety of different sizes and strengths.

Safety chains may be secured between the trailer and an anchor within the truck, preferably associated with the hitch to prevent the trailer from breaking away from the pickup truck in the event that the hitch uncouples from the hitch ball. To insure that the safety chain anchor does not substantially obstruct the bed of the truck when the hitch is not being used, the anchor may be adapted so that it may be removed from the hitch or so that it may be lowered to a stowed position in the hitch. Therefore, a need exists in the art to provide an improved safety chain tie down apparatus that is easily removable and operable as well as work with a variety of different hitches.

SUMMARY OF THE PRESENT INVENTION

The present disclosure describes an apparatus for a removable safety chain tie down. The tie down apparatus may be utilized for securing an item, such as a safety chain, wherein the tie down apparatus may be used with a hitch mounting system. In one embodiment, the tie down apparatus may include a receiving member and a tie down member threadingly engaged with the receiving member.

A hitch mounting system may include at least one rail capable of being connected to a vehicle frame, at least one socket formed in the at least one rail, a mid rail connected to the at least one rail, where the mid rail includes a hitch ball socket, and a receiving member capable of being secured to the at least one socket. The hitch mounting system may also include a body member capable of being inserted into the receiving member and threadingly attached.

A hitch mounting system may include at least one rail capable of being connected to a vehicle frame, where the rail includes a pair of sockets integrally formed with the at least one rail, a mid rail capable of being connected to the at least one rail, where the mid rail includes a hitch ball socket, and a receiving member capable of being secured within the socket. The hitch mounting system may also include a tie down member with a locking member having a post with a generally triangular body and a flat head along with a plurality of wedges wedgingly and selectively engaging the tie down member with the receiving member. Additionally, a bar may be attached between a plurality (e.g., two, three, four, etc.) of the tie down members.

A hitch mounting system may include at least one tubular member, a central member attached to the tubular member, a pair of integrally formed members having first and second end portions, where the first end portions are received within the tubular member and the second end portions are capable of attaching to a frame of a vehicle, and a socket integrally formed in each of the pair of integrally formed members. The hitch mounting system may also include a receiving member positioned in the sockets, a body member inserted into the receiving member, and a locking member having a pair of biasing balls selectively engaging the body member with the receiving member.

A tie down apparatus for securing an item is shown and described. The tie down apparatus may include a locking member that may selectively engage the tie down apparatus with the receiving member. The locking member may be of any appropriate configuration, such as a wedge assembly, a threaded post, biasing ball members, and the like.

One embodiment encompasses any combination of the following elements:
- a locking member having a body with a flattened bottom portion and a threaded post extending downward from the body beyond the flattened bottom portion;
- a receiving member having an upper rim, at least one sidewall extending downward from the upper rim and further defining the aperture, and a bottom portion;
- wherein the upper rim, the at least one sidewall define an aperture which receives the threaded post;
- wherein at least a portion of an inner facing surface of the aperture includes corresponding threads;
- wherein the bottom portion further defines the aperture;
- wherein a plurality of sidewalls are provided, each sidewall defining the aperture between the upper rim and the bottom portion;
- wherein only a portion of the threaded post engages the corresponding threads of the receiving member;
- wherein the locking member includes a handle attached to and extending upward from the body;
- wherein the handle forms an L-shape;
- wherein the handle attaches to the body at two separate points;
- wherein the handle is integrally formed with the body;
- wherein the locking member is rotatably secured to the receiving member;
- wherein the threaded post is integrally formed with the body;
- wherein the upper rim, the at least one sidewall, and the bottom of the receiving member are integrally formed; and
- wherein the upper rim abuts the flattened bottom portion.

Another embodiment encompasses any combination of the following elements:
- a locking member having a body with a flattened bottom portion and a locking member aperture which receives a removable post;
- a receiving member having an upper rim, at least one sidewall extending downward from the upper rim and further defining the aperture, and a bottom portion;
- wherein the upper rim, the at least one sidewall define an receiving member aperture which, when aligned with the receiving member aperture, receives the removable post so as to secure the locking member to the receiving member;
- wherein the removable post includes at least one aperture and at least one locking ball and the removable post has a flattened top portion with a larger diameter than a diameter of the receiving member aperture;
- wherein the at least one locking ball includes a biasing mechanism;
- wherein the at least one aperture and the at least one locking ball cooperate with a slot in the receiving member to secure the locking member to the receiving member;
- wherein the removable post has a narrowing T-shape;
- wherein the removable post wedgingly engages the receiving member to secure the locking member to the receiving member;
- a plurality of wedge members removably positioned between a narrowing portion of the removable post, an inner facing surface of the receiving member aperture, and an inner facing surface of the receiving member aperture;
- wherein at least one wedge member has a tabbed portion proximate to the narrowing portion of the removable post;
- wherein the tabbed portion is biased;
- wherein the removable post is part of a trapped subassembly, the trapped subassembly having a plurality of wedge members;
- wherein trapped subassembly comprises a tabbed portion which engages the receiving member;
- wherein the locking member includes a handle attached to and extending upward from the body;
- wherein the handle forms an L-shape;
- wherein the handle attaches to the body at two separate points;
- wherein the handle is integrally formed with the body; and
- wherein the upper rim, the at least one sidewall, and the bottom of the receiving member are integrally formed.

BRIEF DESCRIPTION OF THE DRAWINGS

Objects and advantages together with the operation of the present teachings may be better understood by reference to the detailed description taken in connection with the following illustrations, wherein.

DETAILED DESCRIPTION

Figure 1:
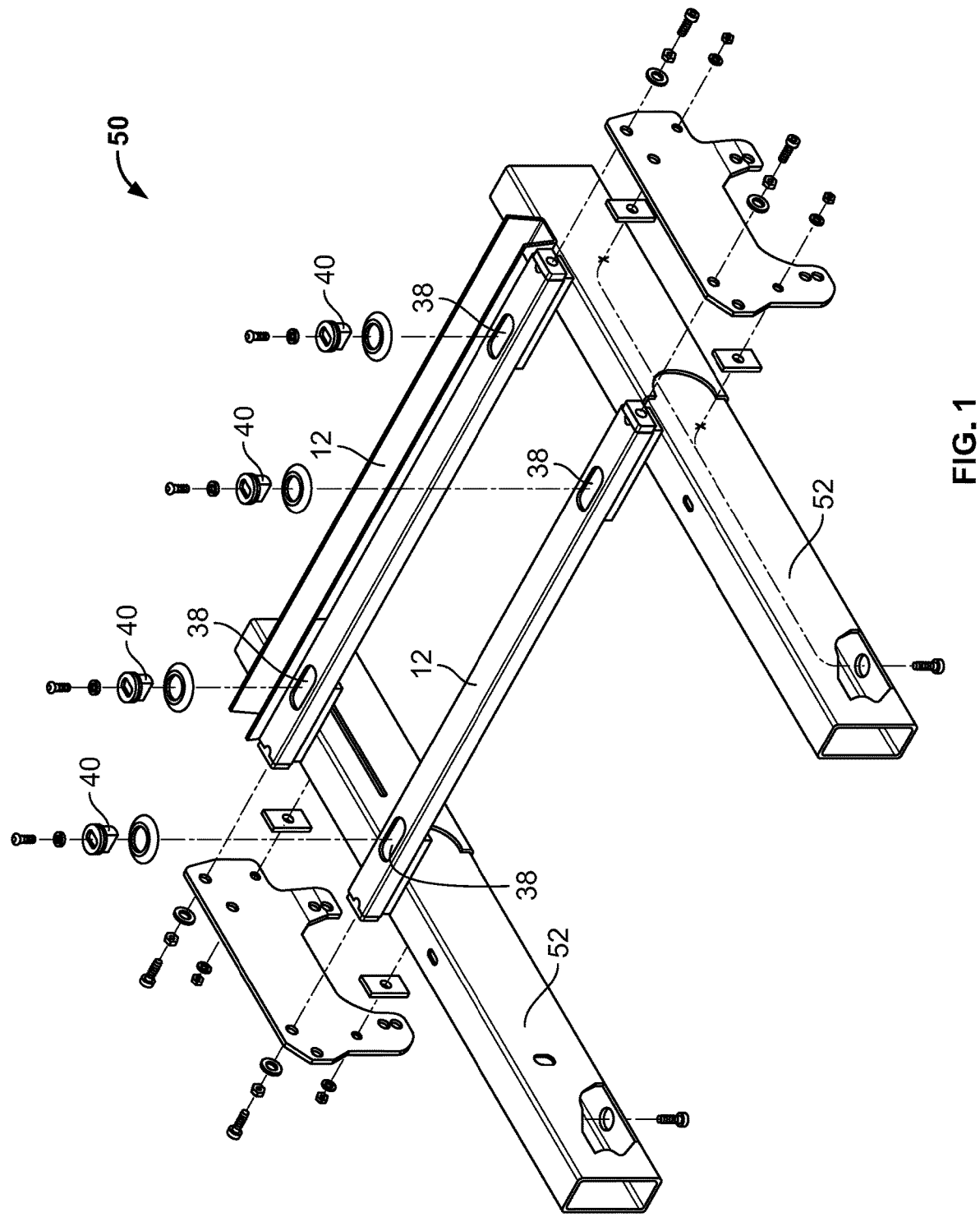
FIG. 1 is a perspective and exploded view of a portion of an exemplary under bed hitch mounting system.

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments, not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

A removable safety chain tie down apparatus or assembly 10 is illustrated in FIGS. 4-7. The removable safety chain tie down apparatus 10 can improve the safety of securing the trailer to a towing vehicle. The removable safety chain tie down apparatus 10 may include an insertion or tie down member 20, a locking member 30 and a receiving member 40. The removable safety chain tie down apparatus 10 provides a practical safety chain tie down apparatus that may be associated with and attached to a trailer mounting system where the removable safety chain tie down apparatus 10 may be adapted to reliably and securely engage the links of a safety chain (not shown). Unlike the prior art, the safety chain tie down assembly 10 may be reliably secured to the safety chain itself without the need for additional intermediate hooks or couplings.

The safety chain tie down apparatus 10 may be constructed to securely and removably anchor down the safety chain that may be in use with a trailer hitch. The removable safety chain tie down apparatus 10 may be of any number of appropriate shapes or sizes in addition to those shown in the figures and may have a streamlined design and appearance that may be aesthetically pleasing. The removable safety chain tie down apparatus 10 may be used with any appropriate trailer hitch mounting kit, such as those that utilize rail mounts or cross members 12 for example, such as with the "Signature Series" produced and sold by Cequent.

The insertion or tie down member 20 may be of any suitable shape or size, such as substantially ovalar, rectangular or other shapes. The tie down member 20 may be constructed from a variety of appropriate materials, such as of a durable plastic material or a strong metallic material. The tie down member 20 may be a one-piece integrally formed member.

Figure 4:
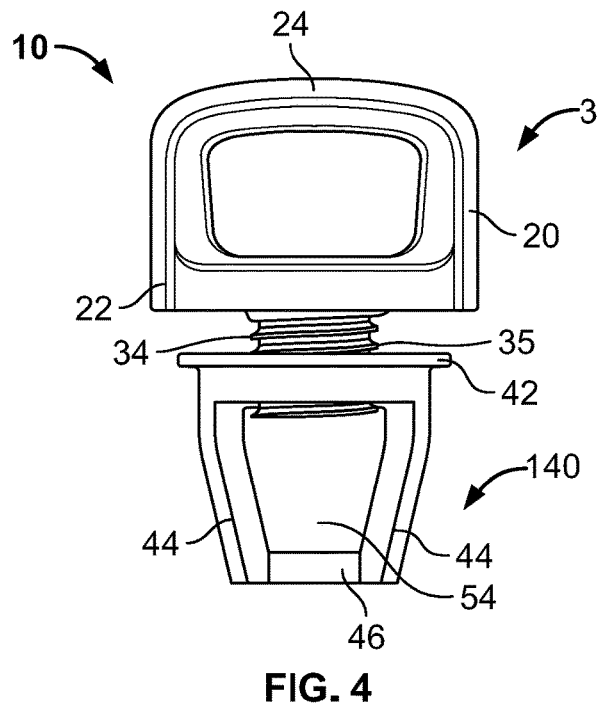
FIG. 4 is a front view of an embodiment of a safety chain tie down apparatus.
Figure 5:
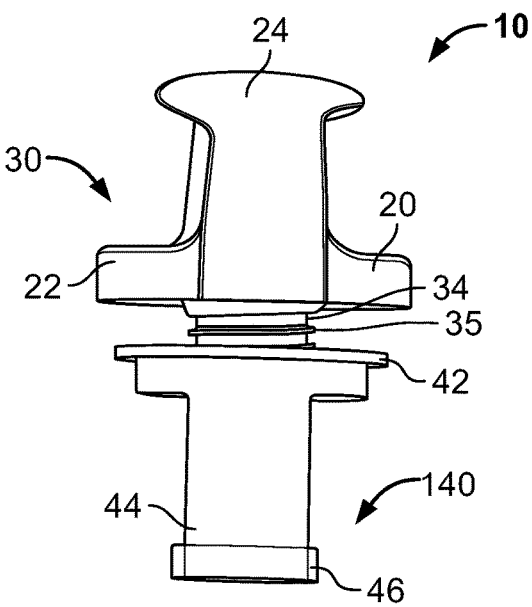
FIG. 5 is side view of the safety chain tie down apparatus of FIG. 4.
Figure 6:
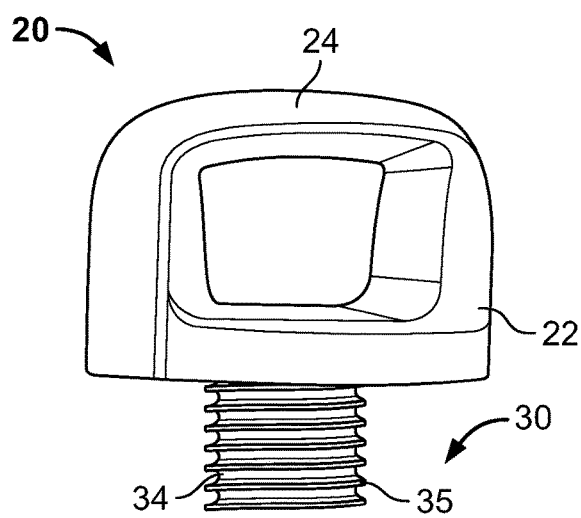
FIG. 6 is a front view of a portion of the safety chain tie down apparatus of FIG. 4.

The insertion or tie down member 20 may include a body 22 and a handle 24. The handle 24 may extend outwardly from one side of the body 22 or both sides thereof. The handle 24 may be of any appropriate shape or size. The handle 24 may also be of a contoured shape for ease and comfort of use, as shown in FIGS. 4-6. While the handle 24 is shown as extending from two sides of the body 22, it is to be understood that the handle 24 may only be attached to the body 22 on one side (such as a generally L-shaped handle) or may be attached on any desired number of sides, such as three or four, and the like. In addition, the handle 24 may be integrally formed with the body 22 or may be a separate piece from the handle, which may require attachment by any appropriate means, such as with fasteners, welding, or the like. Further, the handle 24 may be selectively attached with the body 22 such that the handle 24 or a portion thereof may be positioned to allow the safety chain to be inserted or otherwise engaged with the handle 24.

The locking member 30 may include at least one leg 34 that may extend from the body 22. The locking member 30 may be a one-piece integrally formed member with the body 20 or may be attached such as through a subsequent operation. The leg 34 may extend outwardly, such as perpendicularly away from a bottom of the body 22, for example. The leg 34 may be of any appropriate shape or size, such as, for example, a cylindrical, ovular, or rectangular, for example. While the locking member 30 has been shown and disclosed utilizing certain features, the locking member 30 may utilize any appropriate configuration to lock the safety chain into place within the tie down member 20 and receiving member 40.

In some embodiments, the locking member 30 may include a threaded portion 35, as shown in FIGS. 4-6. The threaded portion 35 may be of any appropriate configuration. By way of a non-limiting example, the threaded portion 35 may be a male threaded configured to engage a corresponding female threaded member described in more detail below.

Figure 7:
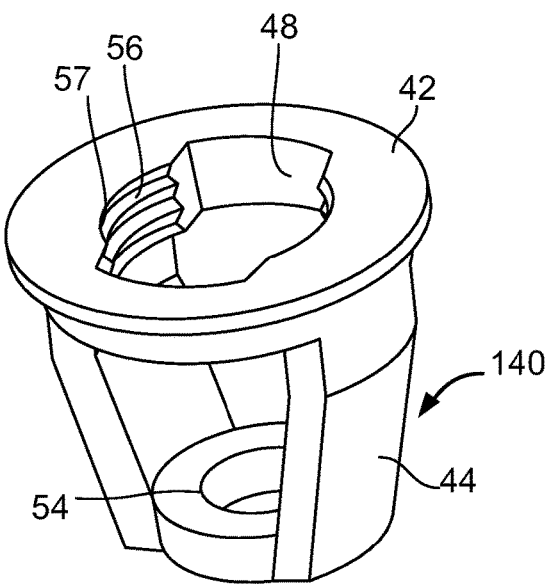
FIG. 7 is a perspective view of a portion of an under bed hitch mounting system.

FIGS. 4-5 and 7 depict an exemplary receiving member 140. The receiving member 140 may include an upper rim 42, at least one sidewall 44 and a base or bottom wall 46. The receiving member 140 may be of any appropriate shape or size, such as a cylindrical, oval, or a square shape, for example, and should not be limited to that shown in the Figures. The receiving member 140 may be a one-piece integrally formed member. The sidewalls 44 may extend generally perpendicularly from the upper rim 42. Alternatively, the sidewalls 44 may extend at an angle downwardly from the upper rim 42 as shown. While shown having two sidewalls 44 it is to be understood that there may be any appropriate number of sidewalls 44 and should not be limited to that shown and disclosed herein.

The base or bottom wall 46 may connect the two sidewalls 44. The bottom wall 46 and the sidewalls 44 may generally form an opening 54 therein. The receiving member 140 may also include an aperture 48 that may receive the leg 34 the tie down member 20, whereby the aperture 48 may also be correspondingly shaped and sized to receive the leg 34. The upper rim 42 may extend radially and outwardly from the receiving member 140. The upper rim 42 may provide a surface for the body 22 of the tie down member 20 to abut or rest on. An inner facing 57 of the sidewalls 44 may include a threaded portion 56, such as that shown in FIG. 7. The threaded portion 56 may be a female thread that may matingly engage with the threaded portion 35 of the leg 34. The threaded portion 56 may extend an entire of the periphery of the aperture 48 or a portion thereof. As shown in FIG. 7, the threaded portion 56 may only extend approximately one-quarter of the periphery of the aperture 48. In other embodiments, the threaded portion 56 may extend 100%, 75%, 66%, 50%, 33% or 25% of the periphery of the aperture 48. These, however, are exemplary embodiments and the threaded portion 56 may extend any portion of the periphery that engages the threaded portion 35 of the leg 34.

In use and to secure a safety chain, for example, a consumer may place the tie down member 20 near a top of the upper rim 42 of the receiving member 140, so that the leg 34 may drop into the corresponding aperture 48. The user may then rotate the tie down member 20 so that the threaded portion 35 matingly engages with the threaded portion 56 selectively securing the tie down member 20 with the receiving member 140.

When the components of the safety chain tie down apparatus 10 have been rotated into the correct position, the locking member 30 will engage with the receiving member 140. The locking member 30 may be captured in the receiving member 140 to prevent it from inadvertently coming out of the receiving member 140 when not in use.

Trailer hitches, such as a gooseneck or fifth wheel hitch may be mounted to a truck bed. These types of hitches are often mounted beneath the truck bed in conjunction with the truck's own frame rails, such as with cross members or rails 12 for example. In addition, these cross members 12 may be mounted to the truck bed with the use of the receiving members 40, also known as pucks. Utilizing a puck mounting system for the trailer hitch may allow the hitch to be installed in the pickup truck bed with only four small holes. Utilizing a puck mounting system may provide uninhibited use of your truck bed when the hitch is dismounted. The puck mounting system may also provide for a wider platform and mounting surface, which increases the stability.

The safety chain tie down apparatus 10 may take advantage of an under bed mounting system designed for the various types of hitches. These types of hitches may mount on top of an under bed rail mounting system where the hitch ball may either be removed or folded down for easy access. For example, the safety chain apparatus 10 may allow users that have an existing rail kit to use the receiving members 40 for safety chain hook ups on gooseneck trailers.

FIG. 1 depicts an exemplary vehicle mounting system 50. The vehicle mounting system 50 may include at least two rails or cross members 12. The cross members 12 may include sockets 38 for attachment with a receiving member 40. The cross members 12 may mount to the vehicle framework 52 by any appropriate means, such as with fasteners, by welding or the like. Each receiving member 40 may be mounted in a socket 38 provided in either of the cross members 12. The receiving member 40 may be secured in the socket 38 by any appropriate means, such as with fasteners, welding or the like. For example, a fastener, such as a bolt, could pass through an aperture in the bottom wall of the cross member 12 and be secured in place by a cooperating nut and lock washer (not shown) if desired.

Figure 2:
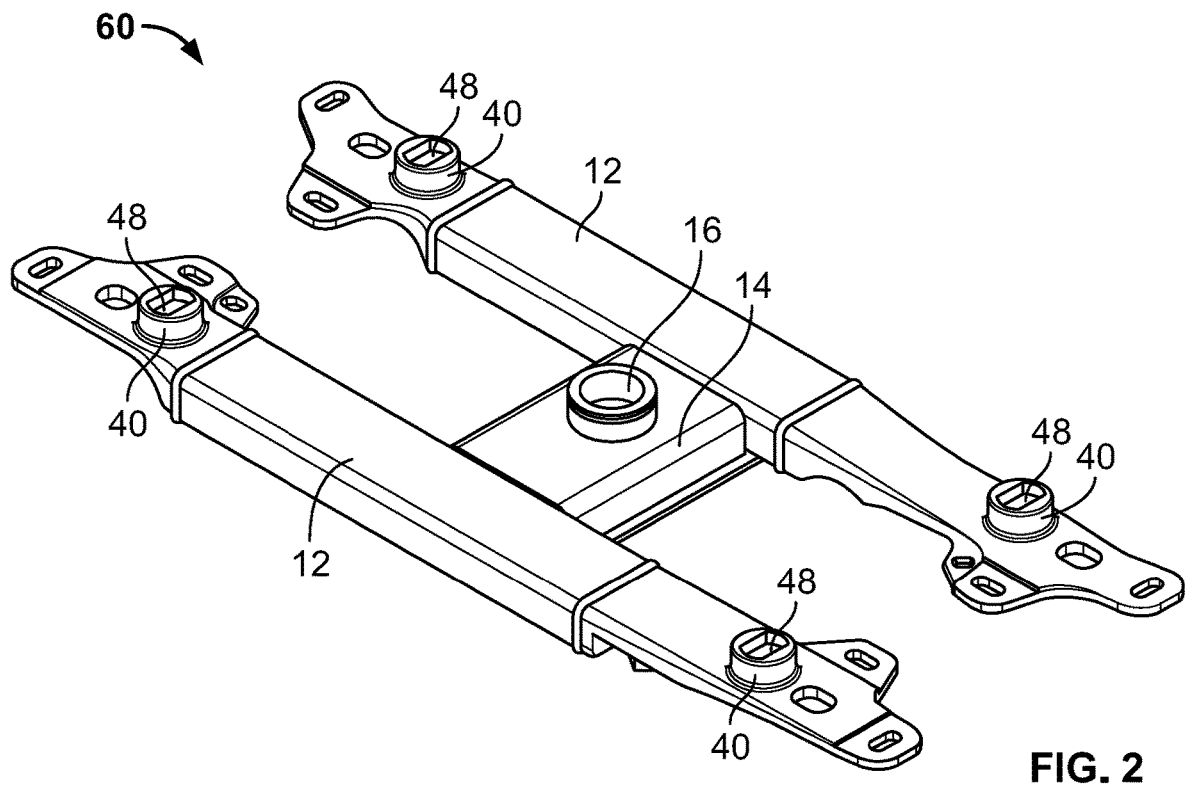
FIG. 2 is a perspective view an alternative embodiment of an under bed hitch mounting system.
Figure 3:
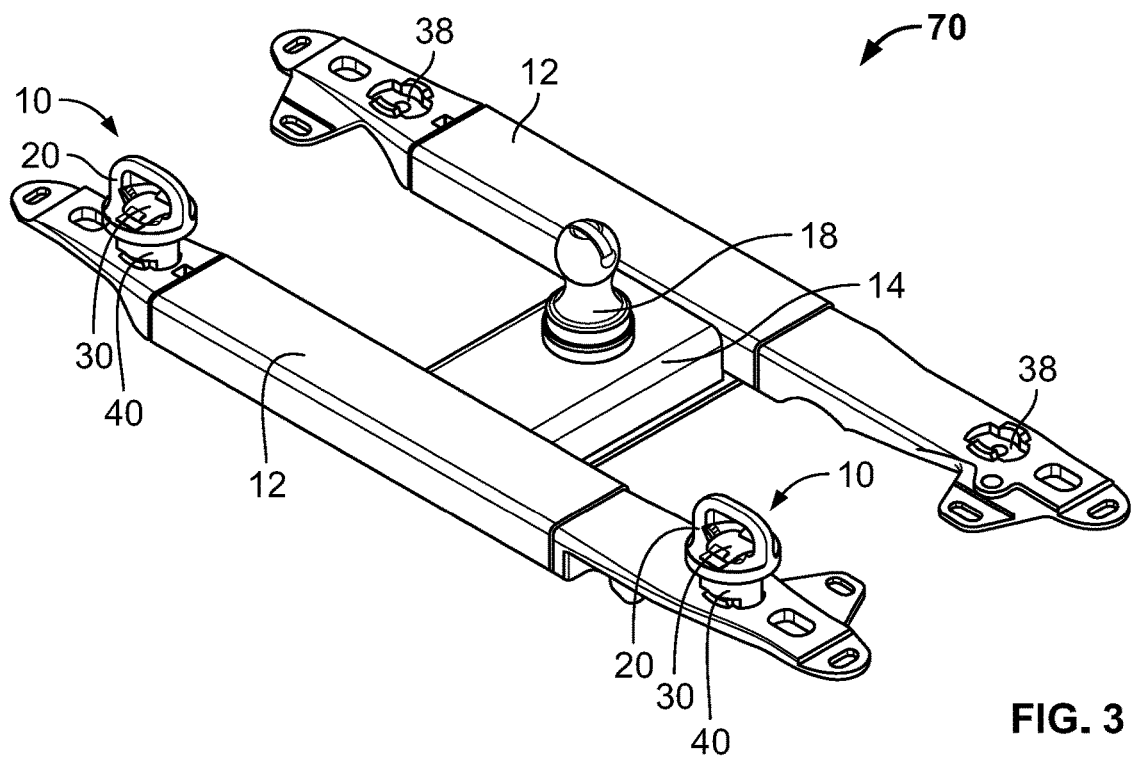
FIG. 3 is a perspective view the under bed hitch mounting system of FIG. 2 with a gooseneck ball engaged and an exemplary safety chain tie down apparatus.

FIG. 2 depicts an exemplary mounting system 60. Specifically, it depicts an integrally formed mounting system 60, whereby the receiving members 40 may be formed within the cross members 12. FIG. 3 depicts a mounting system 70 where the receiving members 40 may be placed and secured into sockets 38 located within the cross members 12. In FIGS. 2 and 3, the cross members 12 may be attached to one another by a mid rail 14. The hitch ball socket 16 and corresponding hitch ball 18 may be located on the mid rail 14.

Additional embodiments of a removable safety chain tie down apparatus according the present teachings are described below. In the descriptions, all of the details and components may not be fully described or shown. Rather, some of the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired removable safety chain tie down apparatus without departing from the spirit and scope of the present teachings.

A removable safety chain tie down apparatus or assembly 110, such as that shown in FIGS. 8-14, may include an insertion or tie down member 120, a locking member 130 and a receiving member 140. The safety chain tie down apparatus 110 may be constructed to securely and removably anchor down the safety chain often utilized with a trailer hitch. The safety chain tie down apparatus 110 may be of any appropriate configuration. It may possess any number of appropriate shapes or sizes in addition to those shown in the figures. The safety chain tie down apparatus may also have a streamlined design and appearance that may be aesthetically pleasing. The safety chain tie down apparatus 110 may be used with any appropriate trailer hitch mounting kit, such as those that utilize rail mounts or cross members 12 for example, such as with the "Signature Series" produced and sold by Cequent Performance Products, Inc. The present teachings, however, are not limited to the configuration shown or limited to use with the cross members 12 shown. The safety chain tie sown apparatus 110 may be utilized with any appropriate trailer hitch system.

The insertion or tie down member 120 may be of any suitable shape or size, such as substantially oval, rectangular or other shapes. The tie down member 120 may be constructed from a variety of appropriate materials, such as of an appropriate metal material or durable plastic material, including, without limitation high strength steel. The tie down member 120 may be a one-piece integrally formed member, i.e., a monolithic member. In such embodiments, the tie down member 120 may be formed from casting of high-strength steel by way of non-limiting example.

The insertion or tie down member 120 is shown in FIGS. 8-13. The tie down member 120 may include a body 122 and a handle 124. The handle 124 may extend outwardly from one side of the body 122. The handle 124 may be of any appropriate shape or size. The handle 124 may also be of a contoured shape for ease and comfort of use. While the handle 124 is shown as extending from two sides of the body 122, it is to be understood that the handle 124 may only be attached to the body 122 on one side (such as a generally L-shaped handle) or may be attached on any desired number of sides, such as three or four, and the like. In addition, the handle 124 may be integrally formed with the body 122, such as a monolithic member, or may be a separate piece from the body 122, which may require attachment by any appropriate means, such as with fasteners, welding, or the like. A greater strength may be realized when the handle 124 is monolithically formed with the body 122.

Figure 12:
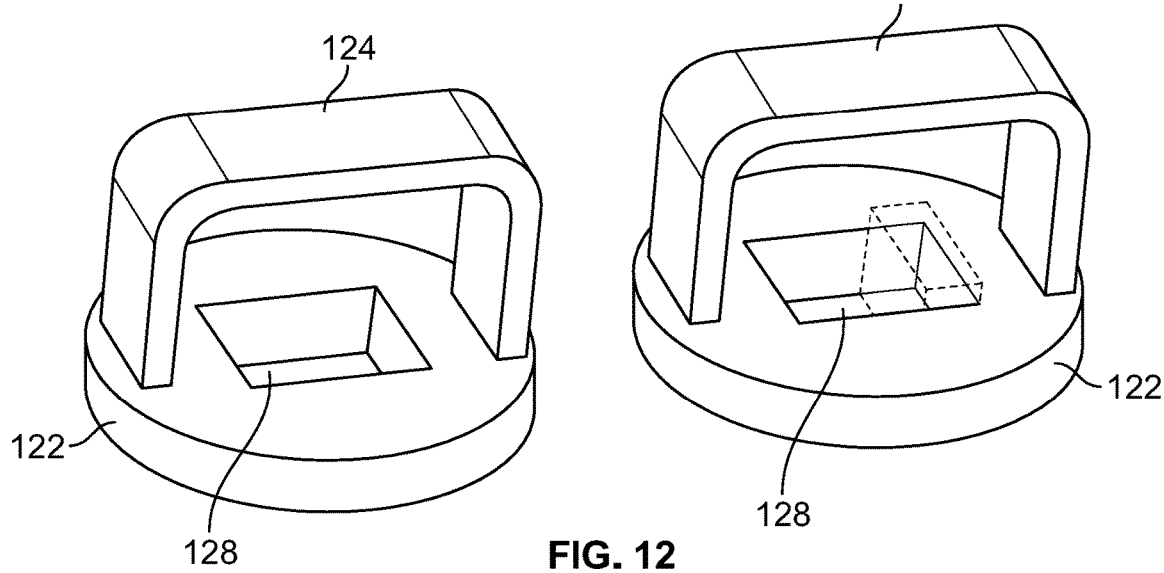
FIG. 12 is a top perspective view of a portion of the safety chain tie down apparatus of FIG. 8.

The body 122 may include at least one aperture 128, as shown in FIG. 12. The aperture 128 may be of any appropriate shape or size, such as being correspondingly shaped and sized to receive the post 136. Any appropriate configuration of the aperture 128 may be used.

Figure 8:
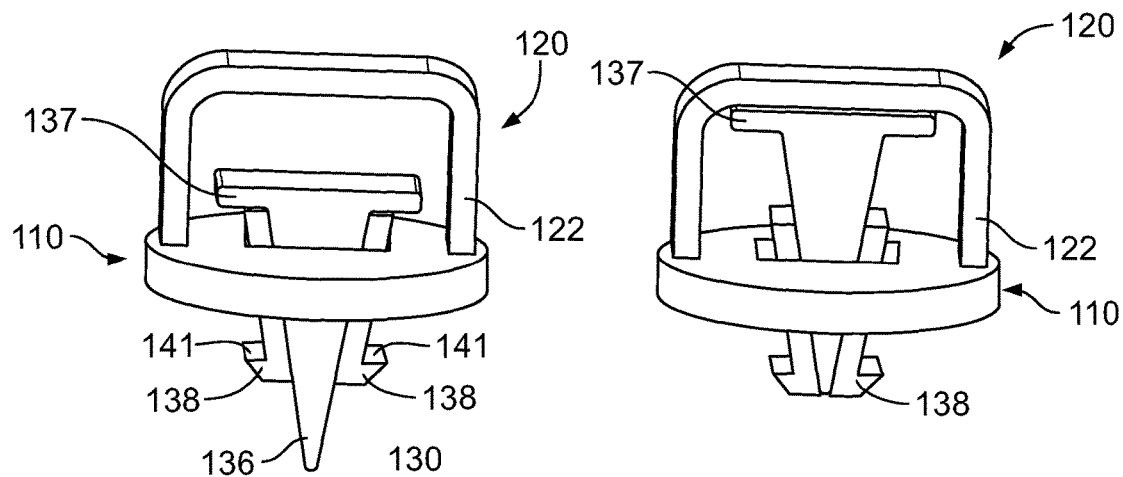
FIG. 8 is a front view of an embodiment of a safety chain tie down apparatus in a partially engaged position and in a disengaged position.
Figure 9:
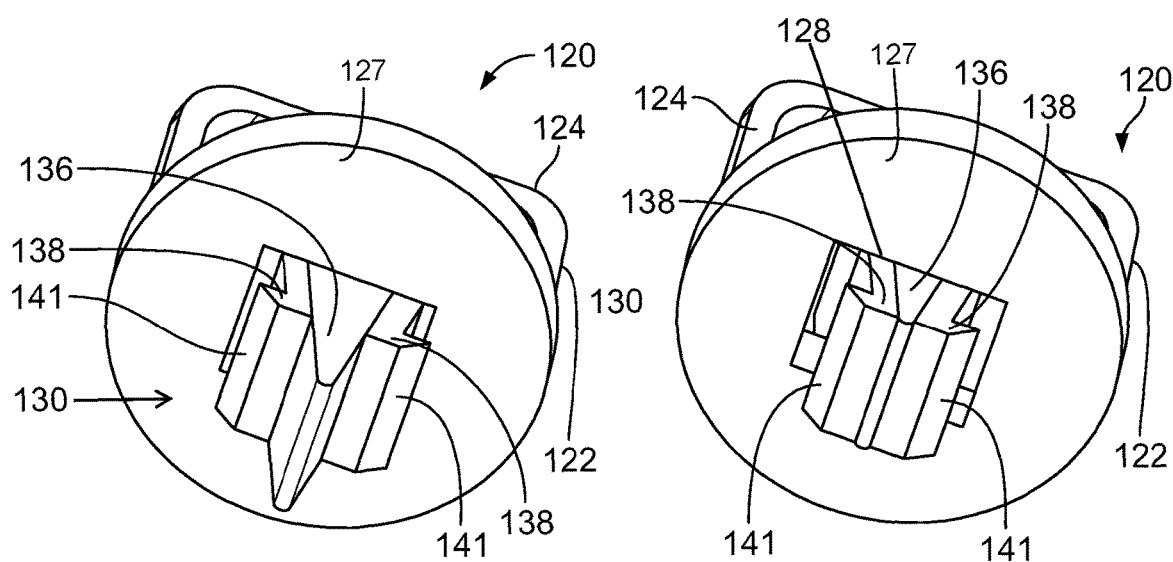
FIG. 9 is a bottom perspective view of the embodiment of the safety chain tie down apparatus of FIG. 8 in the partially engaged position and in the disengaged position.
Figure 10:
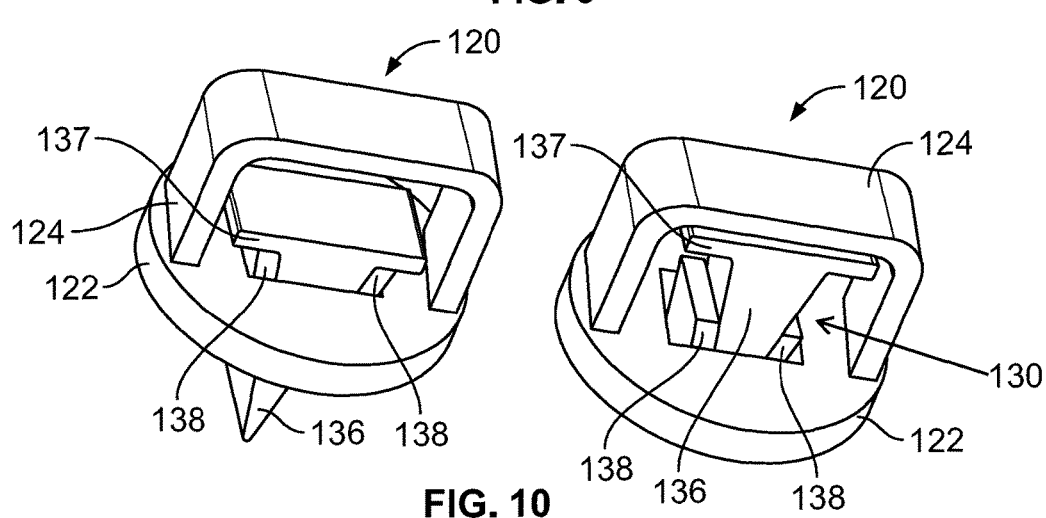
FIG. 10 is a top perspective view of the embodiment of the safety chain tie down apparatus of FIG. 8 in the partially engaged position and in the disengaged position.
Figure 11:
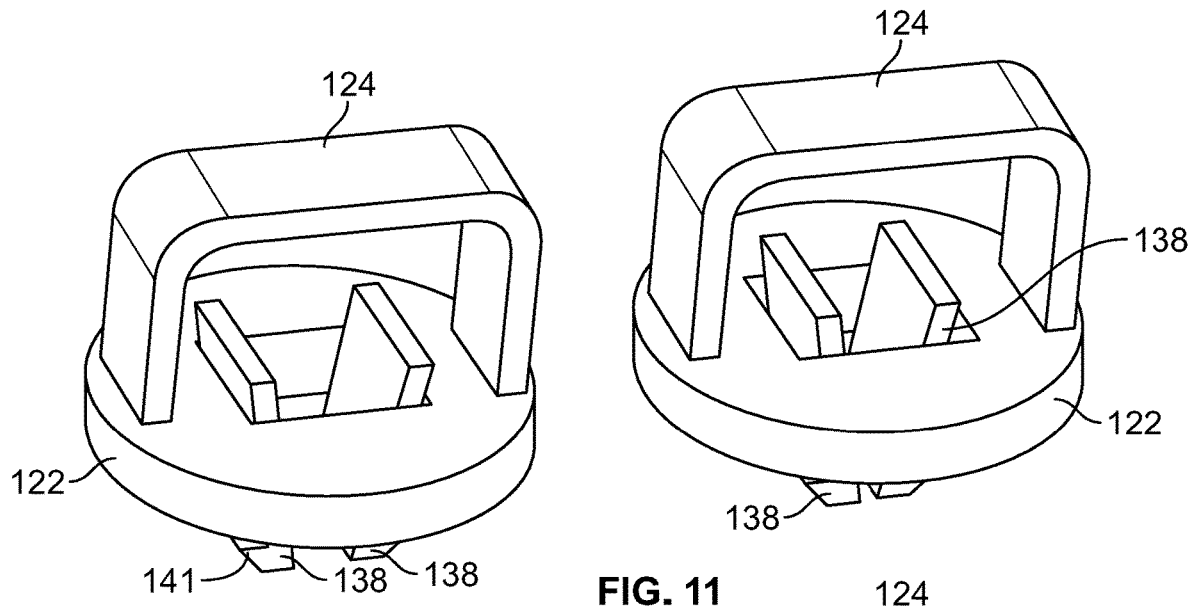
FIG. 11 is a top perspective view of a portion of the safety chain tie down apparatus of FIG. 8 in the partially engaged and in the disengaged position.
Figure 13:
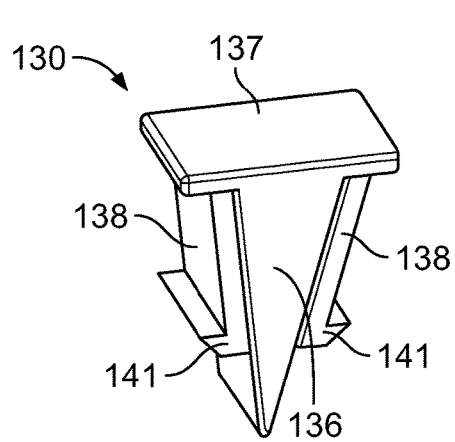
FIG. 13 is a top perspective view of a portion of the safety chain tie down apparatus of FIG. 8 in the partially engaged and in the disengaged position.
Figure 13:
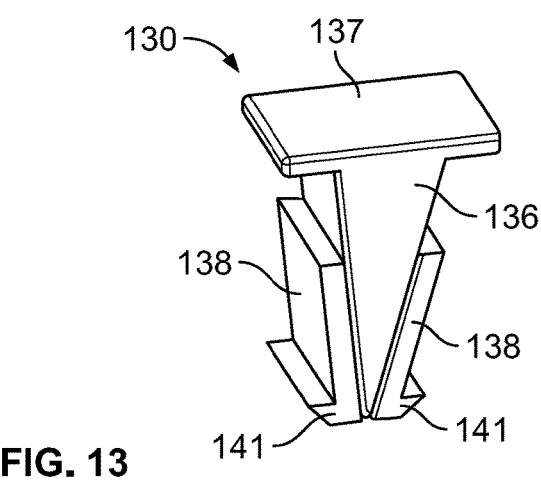

The locking member 130 is shown in FIGS. 8-10. The locking member 130 may include a post 136 of any appropriate shape or size, such as a triangular or rectangular but is not limited to the shapes shown in the Figures. The post 136 may become narrower as it extends downward. By way of a non-limiting example, and as shown in FIG. 13, the post 136 may be of a generally T-shape that thins as it extends downward. In such embodiments, the post 136 may be inserted into the receiving member 140.

The post 136 may include a generally flat top member 137 that may selectively engage the body 122. The top member 137 may be of a shape and size such that it will not pass through the aperture 128. The top member 137 may be of a shape and size to act as a lifting tab. The top member 137 may be of any appropriate shape or size. The top member 137 may be utilized to ease and aid in the lifting of the locking member 130 up from within the tie down member 120.

The locking member 130 may also include wedge members 138. As way of a non-limiting example, the locking member 130 may include a pair of wedge members 138, although the present teachings are not limited to such. Any appropriate number of wedge members 138 may be utilized, e.g., one, three, four, etc.

In such embodiments, the post 136 and wedge members 138 may be inserted into the apertures 128 in the body 122. As the post 136 has a general wedge shape as it moves further into the aperture 128 the width of the locking member 130 (i.e., the wedges 138 and post 136) increases. As this width increases this will cause the locking member 130 to wedgingly engage the receiving member 140 preventing withdrawal of the locking member 130 from the receiving member 140. This selectively engages the safety chain tie down apparatus 110 in an operative position.

Further, the wedges 138 may include a ribbed or tabbed bottom portion 141, which went inserted into the receiving member 140 may engage a bottom surface 127 of the top portion of the receiving member 140. This may prevent withdrawal of the tie down member 120 from the receiving member. In other words, it puts the safety chain tie down apparatus 110 in an operative position. As shown in FIG. 9, as the post 136 is inserted into the receiving member its wedge shape pushes the wedges 138 apart from one another and will permit the ribbed or tabbed bottom portion 141 to engage the receiving member 140. In some embodiments, the ribbed or tabbed bottom portion 141 may be biased to engage and disengage from the receiving member 140.

Further still, this configuration may result in the post 136 and wedges 138 being a trapped subassembly held within the body 122. This configuration may be very robust and may withstand significant forces, including, without limitation side forces. While the locking member 130 has been shown and disclosed utilizing certain features, the locking member 130 may utilize any appropriate configuration to lock the safety chain into place within the tie down member 120 and receiving member 40. Further, while the configuration and assembly of the post 136 and wedges 138 are shown and described above, the present teachings are not limited to such. Any appropriate configuration and assembly may be used without departing from the present teachings.

As noted above, the body 122 being a monolithic member may permit the tie down member 120 to be configured to withstand more forces and loads than other prior art tie down members are configured to handle. By way of a non-limiting example, the tie down member 120 may be configured to withstand side loads. The monolithic nature of the body 122 may generally avoid weak points that may otherwise be present in tie down members that have bodies attached through other methods. Moreover, the monolithic nature may result in the handle 124 being of a robust configuration such that it may withstand significant forces that may be applied during operation. The safety chain may be attached to the handle 124 and during such attachment, side loads may be applied—the tie down member 120 is configured to handle such side-loads. Further, the post 136 and wedges 138 may be a trapped subassembly, i.e., they may be positioned within the body 122 and then attached as detailed above. This trapped subassembly may allow significant loads to be applied to the tie down member 120 during operation.

Similar to that described above, in use and to secure a safety chain, for example, a consumer may place the tie down member 120 on top of the upper rim 42 of the receiving member 140 so that the post 136 and wedges 138 may drop into the corresponding aperture 48 causing locking member 130 to move away from handle 124 such that it moves toward a locked position. Once the tie down member 120 is placed within the receiving member 140, the consumer may push down on the top member 137, which pushes the post 136 down and wedgingly engages the wedges 138 to engage the receiver generally preventing removal of the tie down member 120 from the receiving member 140. When the components of the safety chain tie down apparatus 110 have been positioned into the locking position, the locking member 130 may drop into a locking position, e.g., the ribbed or tabbed portion 141 may engage a surface on the receiving member 140 to prevent withdrawal of the wedges 138. The locking member 130 may prevent the tie down member 120 and thus a safety chain attached thereto from coming out of the receiving member 140 during use. The locking member 130 may be captured in the receiving member 140 to prevent it from inadvertently coming out of the receiving member 140 when not in use. By way of a non-limiting example, when the safety chain components 120, 130, 140 are properly attached, it physically makes it impossible for the locking member 130 to unlock.

Specifically, the locking member 130 when in the locking position generally prevents the tie down member 120 from disengaging from the receiving member 140. When the safety chain is inserted into the loop formed by the handle 124, it may rest against the locking member 130 or otherwise block movement of locking member 130 to an unlocked position. By way of a non-limiting example, the safety chain may engage the handle 124 and rest against the top member 137. The safety chain may generally fill the open space of the handle 124, which may further prevent the locking member 130 from disengaging from the tie down member 120. The safety chain may generally prevent the post 136 and/or wedges 138 from rising within the aperture 128 a distance sufficient to allow disengagement of the tie down member 120. As the safety chain generally prevents the post 136 and/or wedges 138 from rising, the tie down member 120 cannot disengage the receiving member 140, which prevents removal of the tie down member 120 from the receiving member 140.

To remove the locking member 130, a user may pull upward on the top member 137 and pull the post 136 from the receiving member 140. As the post 136 moves upward, the wedges 138 release from the receiving member 140—or more specifically, the ribbed or tabbed end 141 disengages from the receiving member 140. This allows the locking member 130 to be removed from the receiving member 140.

Figure 14:
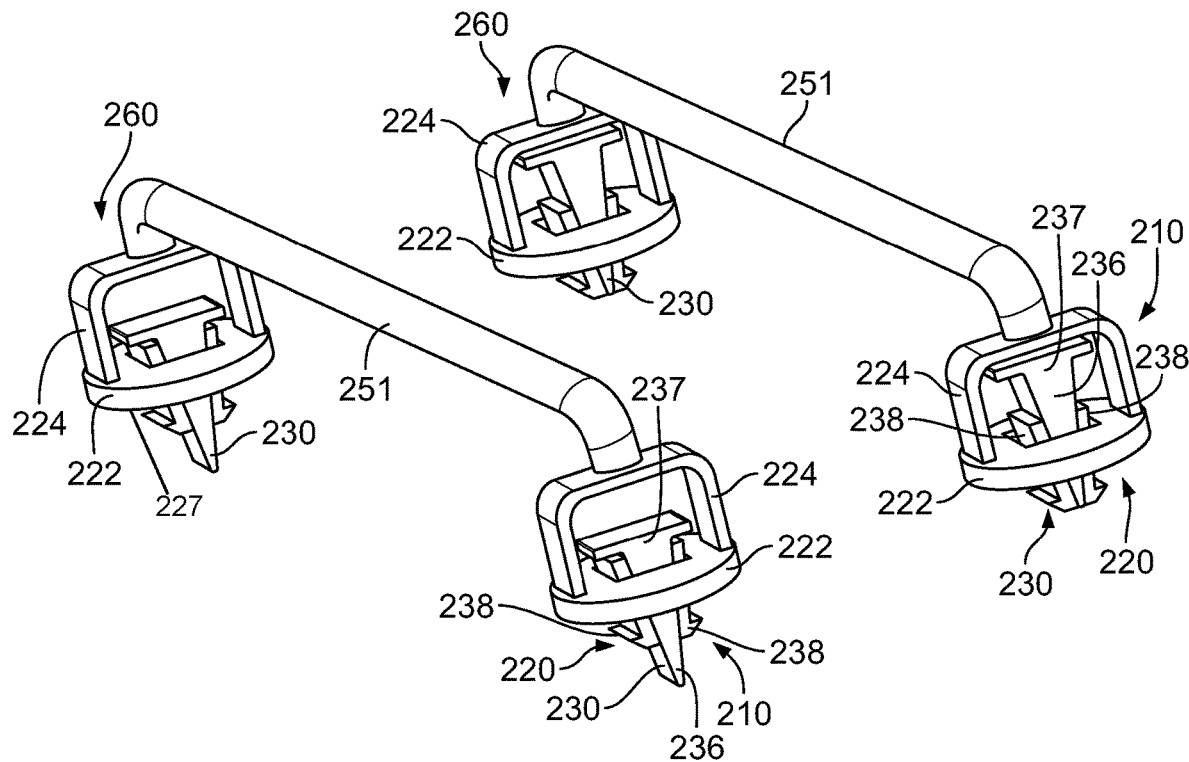
FIG. 14 is a perspective view of an embodiment of a safety chain tie down apparatus in a partially engaged position and a disengaged position.

An embodiment of a removable safety chain tie down apparatus or assembly 210 is shown in FIG. 14. The removable safety chain tie down apparatus 210 may be of a similar configuration to the removable safety chain tie down apparatus 110 described above. By way of a non-limiting example, the removable safety chain tie down apparatus 210 may include a tie down member 220 having a body 222 and a handle 224, which may be configured substantially similar to that of the body 122 and handle 124. Moreover, the removable safety chain tie down apparatus 210 may include a locking member 230 similar to the locking member 130. The locking member 230 may include a post 236 of any appropriate shape or size, such as a triangular or rectangular but is not limited to the shapes shown in the Figures. The post 236 may become narrower as it extends downward. By way of a non-limiting example the post 236 may be of a generally T-shape that thins as it extends downward. In such embodiments, the post 236 may be inserted into the receiving member 40.

The post 236 may include a generally flat top member 237 that may selectively engage the body 222. The top member 237 may be of a shape and size such that it will not pass through an aperture in the body 222. The top member 237 may be of a shape and size to act as a lifting tab. The locking member 230 may also include wedge members 238. As way of a non-limiting example, the locking member 230 may include a pair of wedge members 238. The wedges 238 may include a ribbed or tabbed bottom portion 241, which went inserted into the receiving member 40, may engage a bottom surface 227 of the top portion of the receiving member 140/40. This may prevent withdrawal of the tie down member 220 from the receiving member 140/40.

Further, this configuration may result in the post 236 and wedges 238 being a trapped subassembly held within the body 222. This configuration may be very robust and may withstand significant forces, including, without limitation side forces. While the locking member 230 has been shown and disclosed utilizing certain features, the locking member 230 may utilize any appropriate configuration to lock the safety chain into place within the tie down member 220 and receiving member 40.

The removable safety chain tie down apparatus or assembly 210 may include a bar 251 that may be attached to the tie down member 220, or more specifically to the handle 224. Although, in some embodiments, the bar 251 may be attached to the body 222. The bar 251 may be fixedly attached or selectively attached in any appropriate manner, i.e., welding, fastened, adhered, snap-fit, or otherwise. In these embodiments, the bar 251 may also be attached to a second tie down member 260, which may have a substantially similar configuration to the tie down member 220.

Figure 15:
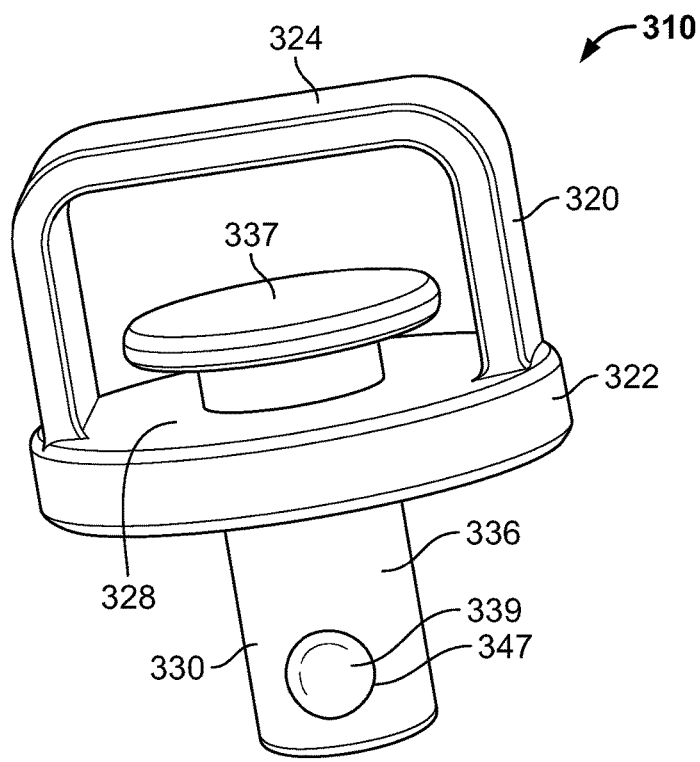
FIG. 15 is a perspective view of an embodiment of a tie down member.
Figure 16:
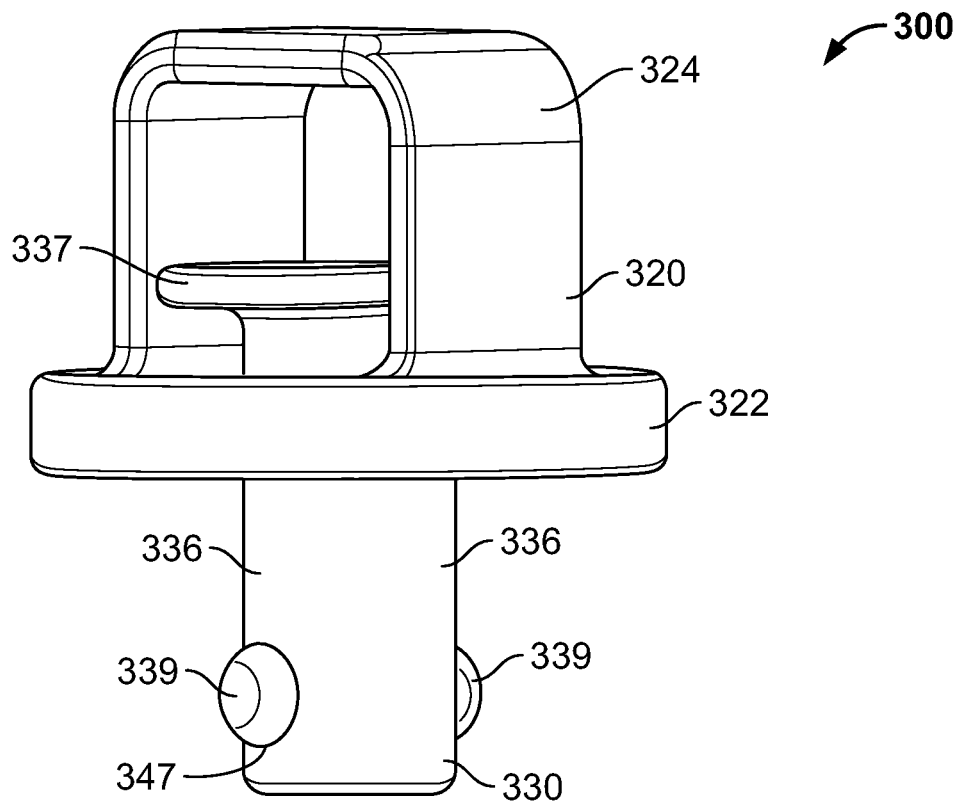
FIG. 16 is a side view of the tie down member of FIG. 14 in a partially engaged position.
Figure 17:
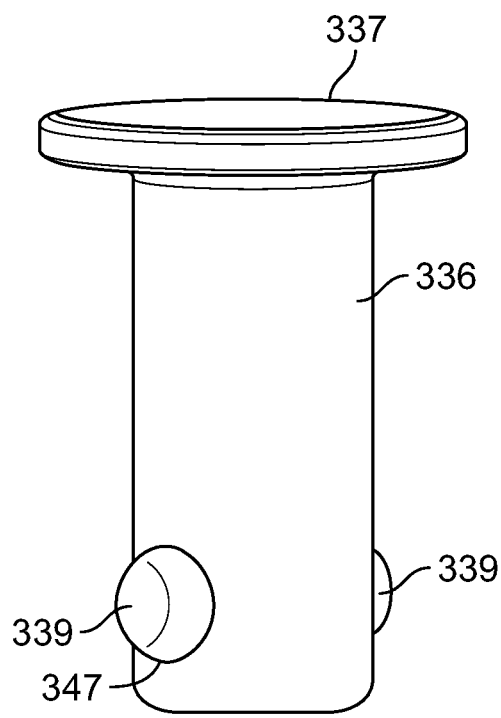
FIG. 17 is a perspective view of a portion of the tie down member of FIG. 14.

A removable safety chain tie down apparatus or assembly 310, such as that shown in FIGS. 15-17, may include an insertion or tie down member 320, a locking member 330 and a receiving member 40. The safety chain tie down apparatus 310 may be constructed to securely and removably anchor down the safety chain often utilized with a trailer hitch. The safety chain tie down apparatus 310 may be of any appropriate configuration. It may possess any number of appropriate shapes or sizes in addition to those shown in the figures. The safety chain tie down apparatus 310 may also have a streamlined design and appearance that may be aesthetically pleasing. The safety chain tie down apparatus 310 may be used with any appropriate trailer hitch mounting kit, such as those that utilize rail mounts or cross members 12 for example, such as with the "Signature Series" produced and sold by Cequent Performance Products, Inc. The present teachings, however, are not limited to the configuration shown or limited to use with the cross members 12 shown. The safety chain tie sown apparatus 310 may be utilized with any appropriate trailer hitch system.

The insertion or tie down member 320 may be of any suitable shape or size, such as substantially oval, rectangular or other shapes. The tie down member 320 may be constructed from a variety of appropriate materials, such as of an appropriate metal material or durable plastic material, including, without limitation high strength steel. The tie down member 320 may be a one-piece integrally formed member, i.e., a monolithic member. In such embodiments, the tie down member 320 may be formed from casting of high-strength steel by way of non-limiting example.

The insertion or tie down member 320 is shown in FIGS. 15-17. The tie down member 320 may include a body 322 and a handle 324. The handle 324 may extend outwardly from one side of the body 322. The handle 324 may be of any appropriate shape or size. The handle 324 may also be of a contoured shape for ease and comfort of use. While the handle 324 is shown as extending from two sides of the body 322, it is to be understood that the handle 324 may only be attached to the body 322 on one side (such as a generally L-shaped handle) or may be attached on any desired number of sides, such as three or four, and the like. In addition, the handle 324 may be integrally formed with the body 322, such as a monolithic member, or may be a separate piece from the body 322, which may require attachment by any appropriate means, such as with fasteners, welding, or the like. A greater strength may be realized when the handle 324 is monolithically formed with the body 322.

The body 322 may include at least one aperture 328, as shown in FIG. 15. The aperture 328 may be of any appropriate shape or size, such as being correspondingly shaped and sized to receive the locking member 330. Any appropriate configuration of the aperture 328 may be used.

The locking member 330 is shown in FIGS. 15-17. The locking member 330 may include a post 336 of any appropriate shape or size, such as generally cylindrical but is not limited to the shapes shown in the Figures. The post 336 may include a generally flat top member 337 that may selectively engage the body 322. The top member 337 may be of a shape and size such that it will not pass through the aperture 328. The top member 337 may be of a shape and size to act as a lifting tab. The top member 337 may be of any appropriate shape or size. The top member 337 may be utilized to ease and aid in the lifting of the locking member 130 up from within the tie down member 320.

The locking member 330 may also include locking balls 339 that may extend from apertures 347 in the post 336. As way of a non-limiting example, the locking member 330 may include a pair of locking balls 339 and apertures 347, although the present teachings are not limited to such. Any appropriate number of locking balls 339 and apertures 347 may be utilized, e.g., one, three, four, etc.

In such embodiments, the post 336 may be inserted into the aperture 328 in the body 322. The balls 339 may be biased in any appropriate manner, such as disclosed in U.S. Pat. Nos. 8,011,685, 6,983,950, and 6,616,168 all of which are hereby incorporated by reference. Moreover, as the post 336 is inserted into the receiving member 140/40, the balls 339 may be biased inward until the post 336 reaches its operative position within the receiving member 140/40. The receiving member 140/40 may include a groove, slot, etc. whereby once the balls 339 enter such they are biased outward. This may prevent withdrawal of the post 336 from the receiving member 140/40—it may operatively secure the safety chain tie down apparatus 310. More specifically, it may operatively secure the tie down member 320 to the receiving member 140/40 and the locking member 330 may generally prevent withdrawal thereof.

Further, when the safety chain is inserted into the loop formed by the handle 324, it may rest against the locking member 330 or otherwise block movement of locking member 330 to an unlocked position. By way of a non-limiting example, the safety chain may engage the handle 324 and rest against the top member 337. The safety chain may generally fill the open space of the handle 324, which may further prevent the locking member 330 from disengaging from the tie down member 320. The safety chain may generally prevent the post 336 from rising within the aperture 328 a distance sufficient to allow disengagement of the tie down member 320. As the safety chain generally prevents the post 336 from rising, the tie down member 320 cannot disengage the receiving member 140/40, which prevents removal of the tie down member 320 from the receiving member 140/40.

In operation, the safety chain tie down apparatus may be used with trailer hitches. Trailer hitches, such as a gooseneck or fifth wheel hitch may be mounted to a load bed of a vehicle. These types of hitches are often mounted beneath the load bed in conjunction with the truck's own frame rails, such as with cross members or rails 12 for example. In addition, these cross members 12 may be mounted to the truck bed with the use of the receiving members 40, also known as pucks. Utilizing a puck mounting system for the trailer hitch may allow the hitch to be installed in the pickup truck bed with only four small holes. Utilizing a puck mounting system may provide uninhibited use of your truck bed when the hitch is dismounted. The puck mounting system may also provide for a wider platform and mounting surface, which increases the stability.

What has been described above includes examples of the present teachings. It is, of course, not possible to describe every conceivable combination of components or methodologies for purposes of describing the present teachings, but one of ordinary skill in the art may recognize that many further combinations and permutations of the present teachings are possible. Furthermore, it is noted that the various embodiments may be altered, combined, or arranged in any desired configuration. For instance, different locking members or components thereof may be combined and utilized in different combinations than illustrated. Accordingly, the present teachings are intended to embrace all such alterations, modifications and variations that fall within the spirit and scope of the appended claims. To the extent that the term "includes" is used in either the detailed description or the claims, such term is intended to be inclusive in a manner similar to the term "comprising" as "comprising" is interpreted when employed as a transitional word in a claim.

Having thus described the invention, I claim:

1. A tie down apparatus for securing an item to an underbed vehicle mounting system, the tie down apparatus comprising:
    a tie down member comprising a body and a handle;
    a locking member extending from the body, the locking member comprising a threaded post extending downward from the body;
    a receiving member having an upper rim, a pair of sidewalls extending downward from the upper rim and a bottom portion, the receiving member configured to engage the underbed vehicle mounting system;
    wherein the upper rim, the sidewalls define an aperture which receives the threaded post; and
    wherein at least a portion of an inner facing surface of each of the sidewalls include corresponding threads to the threaded post.

2. The tie down apparatus of claim 1 wherein the bottom portion further defines an opening.

3. The tie down apparatus of claim 1 wherein only a portion of the threaded post engages the corresponding threads of the receiving member.

4. The tie down apparatus of claim 1 wherein the handle is attached to and extends upward from the body.

5. The tie down apparatus of claim 4 wherein the handle forms an enclosed area configured to accept a safety chain.

6. The tie down apparatus of claim 4 wherein the handle attaches to the body at two separate points.

7. The tie down apparatus of claim 4 wherein the handle is integrally formed with the body.

8. The tie down apparatus of claim 1 wherein the locking member is rotatably secured to the receiving member.

9. The tie down apparatus of claim 1 wherein the threaded post is integrally formed with the body.

10. The tie down apparatus of claim 1 wherein the upper rim, the sidewalls, and the bottom portion of the receiving member are integrally formed.

11. The tie down apparatus of claim 1 wherein the upper rim abuts a flattened bottom portion of the body when the locking member engages with the receiving member.

12. A tie down apparatus for securing an item to a vehicle mounting system, the apparatus comprising:
    a tie down member comprising a body and a handle, the body comprising an aperture; and
    a locking member insertable through the aperture, the locking member comprising a post and at least one wedge member, the post being engageable with the at least one wedge member,
    wherein the post has a narrowing T-shape as it extends from the body of the tie down member, and
    wherein the at least one wedge member comprises a plurality of wedge members removably positioned between a narrowing portion of the post and an inner facing surface of the receiving member.

13. The tie down apparatus of claim 12 wherein the post wedgingly engages a receiving member of the vehicle mounting system to secure the locking member to the receiving member.

14. The tie down apparatus of claim 12 wherein the at least one wedge member has a tabbed portion proximate to the narrowing portion of the post.

15. The tie down apparatus of claim 14 wherein the tabbed portion is biased.

16. The tie down apparatus of claim 12 wherein the handle attaches to the body at two separate points.

17. The tie down apparatus of claim 12 wherein the handle is integrally formed with the body.

* * * * *